Oct. 18, 1960  T C. NOON ET AL  2,956,578
FUEL CONTROL UNIT
Original Filed Oct. 8, 1949  6 Sheets-Sheet 1

Inventors
T Cyril Noon
Walter R. Chapman

Oct. 18, 1960     T C. NOON ET AL     2,956,578
FUEL CONTROL UNIT
Original Filed Oct. 8, 1949     6 Sheets-Sheet 2
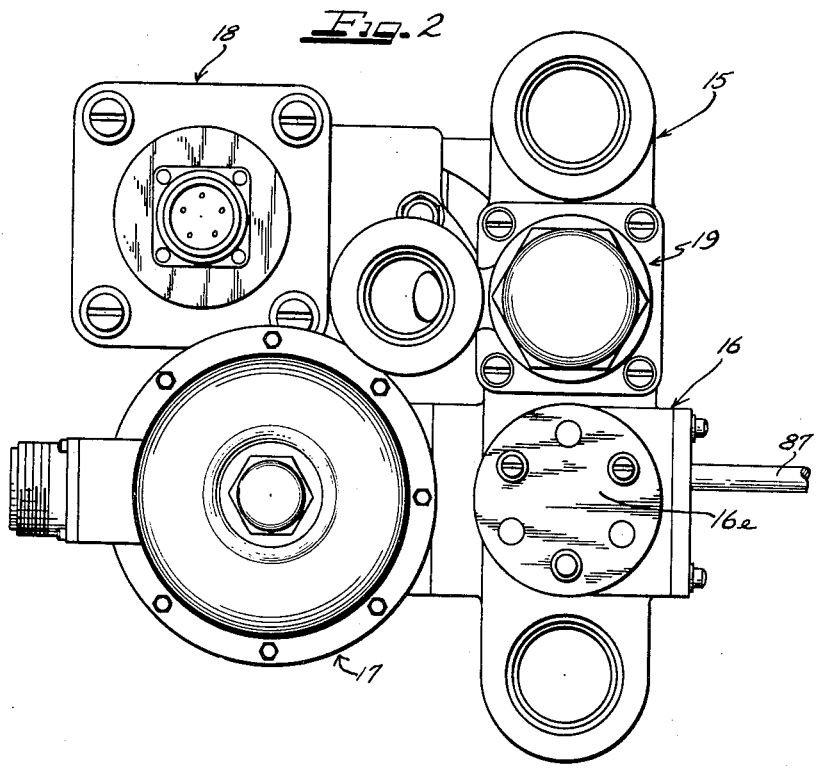
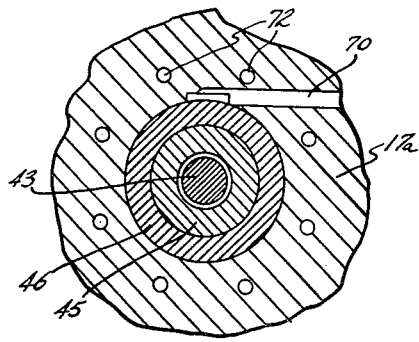
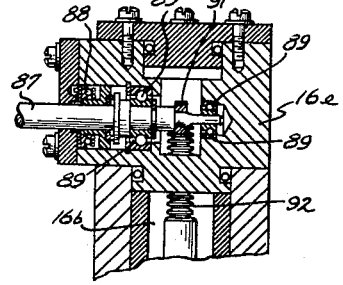
Inventors
T Cyril Noon
Walter R. Chapman

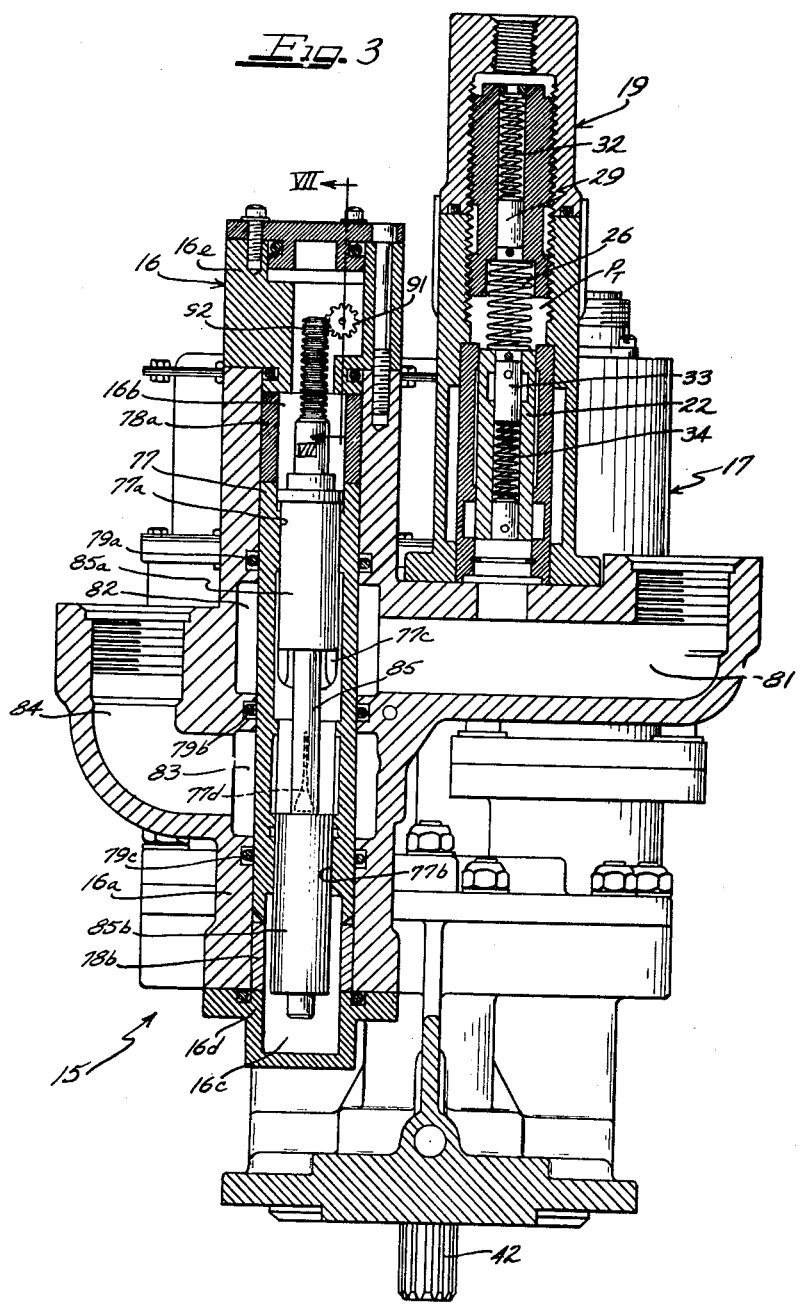

Oct. 18, 1960  T C. NOON ET AL  2,956,578
FUEL CONTROL UNIT
Original Filed Oct. 8, 1949

Inventors
T Cyril Noon
Walter R. Chapman
by The Firm of Charles Hill Attys.

Oct. 18, 1960  T C. NOON ET AL  2,956,578
FUEL CONTROL UNIT
Original Filed Oct. 8, 1949  6 Sheets-Sheet 5
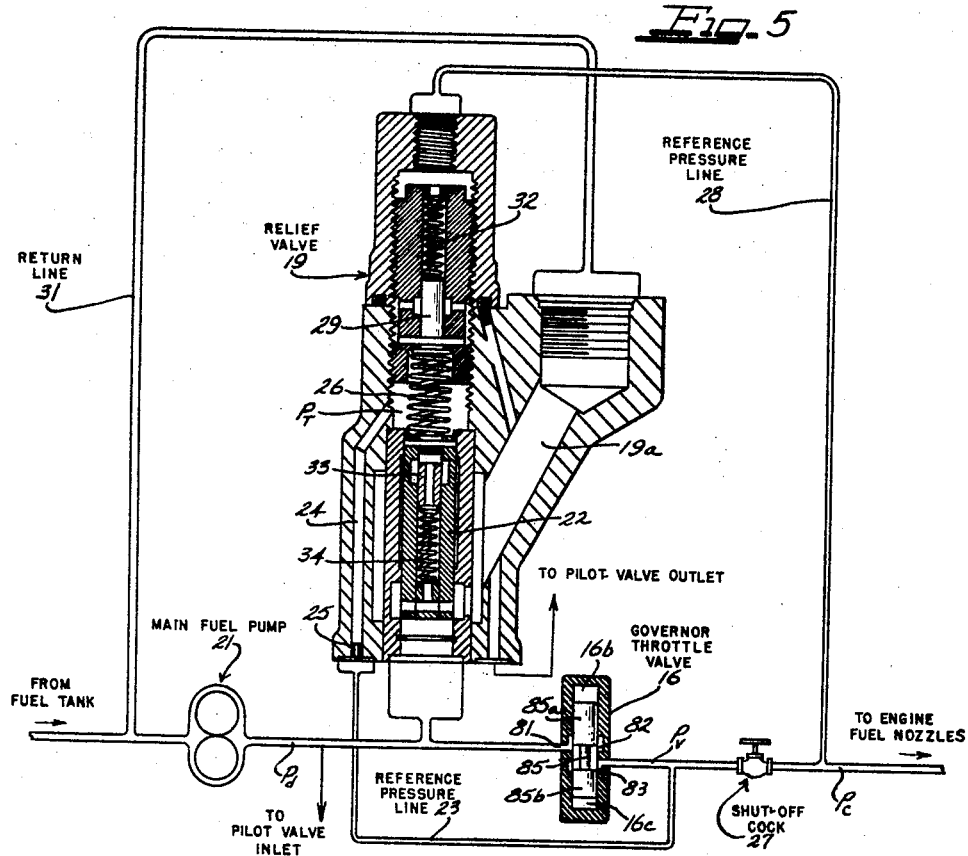
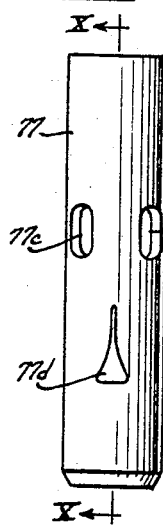
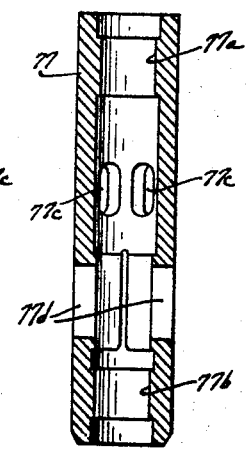
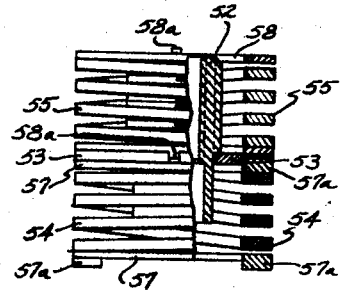
Inventors
T. Cyril Noon
Walter R. Chapman

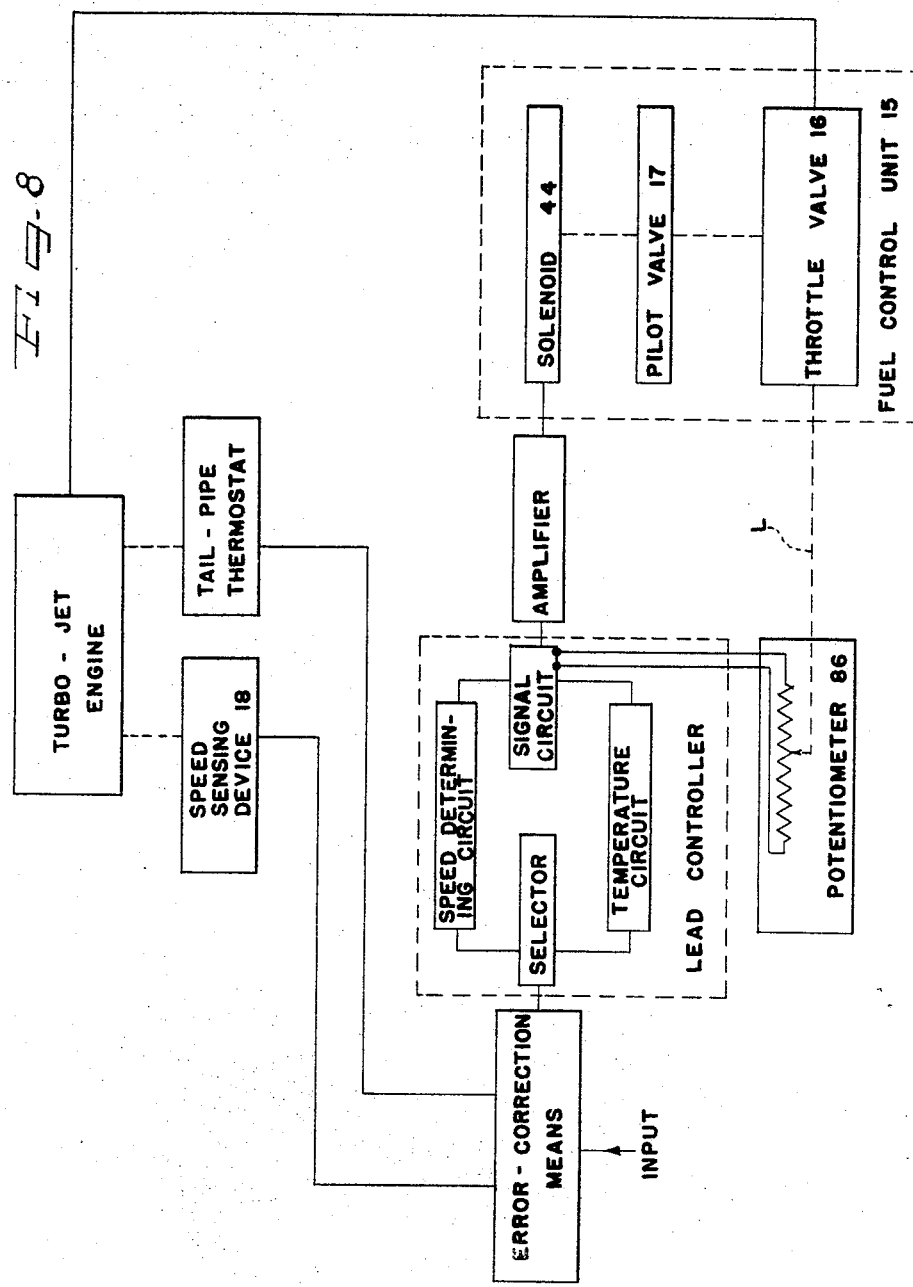

United States Patent Office 2,956,578
Patented Oct. 18, 1960

2,956,578

FUEL CONTROL UNIT

T Cyril Noon, Bainbridge Township, and Walter R. Chapman, Bedford, Ohio, assignors to Thompson Ramo Wooldridge Inc., a corporation of Ohio Original application Oct. 8, 1949, Ser. No. 120,354, now Patent No. 2,718,903, dated Sept. 27, 1955. Divided and this application June 29, 1954, Ser. No. 441,572

10 Claims. (Cl. 137—108)

The invention relates generally to a fuel control unit and more specifically to improvements on electronically actuated fuel control or fuel metering units adapted for installation in the fuel system of a turbo-jet engine whereby the fuel flow to the engine burners of a turbo-jet power plant may be simply and effectively controlled.

The subject matter of the present invention constitutes a continuation-in-part of that previously disclosed in our copending application entitled: Fluid Flow Control System, U.S. Serial No. 89,884, filed April 27, 1949 now U.S. Patent No. 2,707,866, issued May 10, 1955.

This application is divided from our co-pending application Serial No. 120,354, filed October 8, 1949, now U.S. Patent No. 2,718,903, issued September 27, 1955.

As is fully described in the acknowledge copending application, one type of unitary fuel control unit for turbo-jet engine power plants has been heretofore provided in the form of a servo mechanism which, by use of a signal voltage proportional to engine speed and a signal voltage proportional to temperature, as well as various modifying controls, produces a resultant signal for controlling a proportional solenoid which, in turn, actuates a pilot valve in control of fuel flow through a hydraulic servo-operated throttle valve to the burners of a jet engine.

The throttle valve may be operatively associated with other components of the integral fuel control unit including such elements as a relief valve, a pressure regulator, and a speed-sensing unit.

According to the present invention, several significant improvements have been made to the fuel control unit, particularly with respect to the organization of the pilot valve assembly as well at the throttle valve and the operating means and relief valve associated therewith.

It is an object of the present invention to provide a throttle valve structure for a fuel control device of the class herein described which effectively eliminates differential expansion and contraction between the throttle valve piston and the throttle sleeve surrounding the piston.

It is a further object of this invention to provide a throttle valve construction comprising greatly simplified elements which are easier to produce at lower cost of manufacture.

Another object of this invention is to provide a throttle valve structure for a fuel control device whereby leakage between various isolated zones within the throttle valve may be kept the same and equal at all positions of the throttle valve piston.

A further object of this invention is to provide a pilot valve structure having a unique arrangement of components tending to promote the reduction of differential expansion and contraction between the pilot valve elements.

Yet another object of this invention is to use fuel in a fuel control device to maintain uniform temperatures in all portions of the device.

Yet another object of the present invention is to provide a pilot valve structure whereby filtered fuel may be provided as a servo fluid in the operation of the pilot valve.

A further object of the present invention is to provide a method of operating a fuel control device whereby damping thereof may be controlled in response to fuel flow.

A still further object of the present invention is to provide a throttle valve structure capable of practicing the method of controlling the fuel control device whereby damping thereof may be governed in response to fuel flow rather than in response to engine speed and altitude.

Yet another object of the invention is to provide an improved relief valve structure for a fuel control unit.

According to the general features of the present invention, the throttle valve component of the fuel control device is modified by the use of a loosely fitting throttle sleeve positioned by end caps and which is fluid sealed within the throttle valve body at variously spaced locales by O rings. The throttle valve is further characterized by the provision of a throttle sleeve having fixed leakage lands therein and cooperable with a relatively long non-deforming constant diameter piston reciprocable within the sleeve. A throttle valve structure so equipped effectively eliminates the differential expansion and contraction of the sleeve and the piston which ordinarily occurs whenever an ordinary sleeve is pressed directly into a throttle valve body. A throttle valve structure so equipped also permits the observance of close tolerances in the production of a piston in order to produce a condition of perfection within the valve unit, thereby facilitating the production of accurately machined components which are easier to produce and which are more efficient in operation than in the structures heretofore provided.

The pilot valve structure of the present invention is characterized by a pair of reversely turned loading springs positioned in such a manner as to decrease the distance between the pilot valve attachment to the springs and the metering lands of the valve, thereby reducing the effective length of the pilot valve and reducing the effects of differential expansion in the valve. The oppositely turned springs also preclude axial movement of the pilot valve in case of a slight twisting by the pilot valve stem.

The pilot valve of the present invention is further characterized by the provision of a clutch drive for the rotatable sleeve whereby damage due to binding is prevented. A filter is also provided whereby the fuel used as a servo fluid may be freed of all inclusions potentially capable of having a detrimental effect on the operation of the pilot valve.

The assembly of the pilot valve components follows a novel arrangement whereby all working parts may be surrounded by the fuel flowing therethrough so as to maintain the various elements at the same temperature thereby reducing the possibilities of the pilot valve repositioning as a result of differential expansion and contraction occurring between the various elements.

The present invention contemplates the provision of a potentiometer drive whereby damping of the flow control unit may be accomplished in response to fluid flow rather than by engine speed and altitude. In accomplishing this end, a variable resistor or potentiometer is shifted in response to throttle valve position by a mechanical linkage. The resistor in turn controls the magnitude of the signal to a proportioning solenoid which acts as the servo motor for the throttle valve.

Many other features and advantages as well as additional objects of the present invention will become manifest to those versed in the art upon making reference to the detailed description which follows and the annexed sheets of drawings in which a preferred embodiment of a fuel control device modified in accordance with the present invention is illustrated.

On the drawings:

Figure 2 is a top plan view of the fuel control unit;

Figure 3 is a cross-sectional view with parts in elevation of a fuel control unit according to this invention illustrating details of construction of the relief valve and the throttle valve;

Figure 5 is a partly schematic diagram showing the relief valve of the present invention in cross-section to illustrate the various details of construction thereof;

Figure 6 is a fragmentary enlarged cross-sectional view taken on line VI—VI of Figure 4;

Figure 7 is a fragmentary cross-sectional view with parts in elevation of a potentiometer drive for the throttle valve of the present invention;

Figure 8 is a diagrammatic view showing in block diagram form the relationship of various components of the control unit according to this invention;

Figure 9 is an enlarged elevational view of a throttle valve sleeve according to the present invention;

Figure 10 is a cross-sectional view taken on line X—X of Figure 9; and

Figure 11 is a fragmentary view of a spring assembly partly broken away and with parts in section employed in the pilot valve structure of the present invention.

As shown on the drawings:

Figure 1:
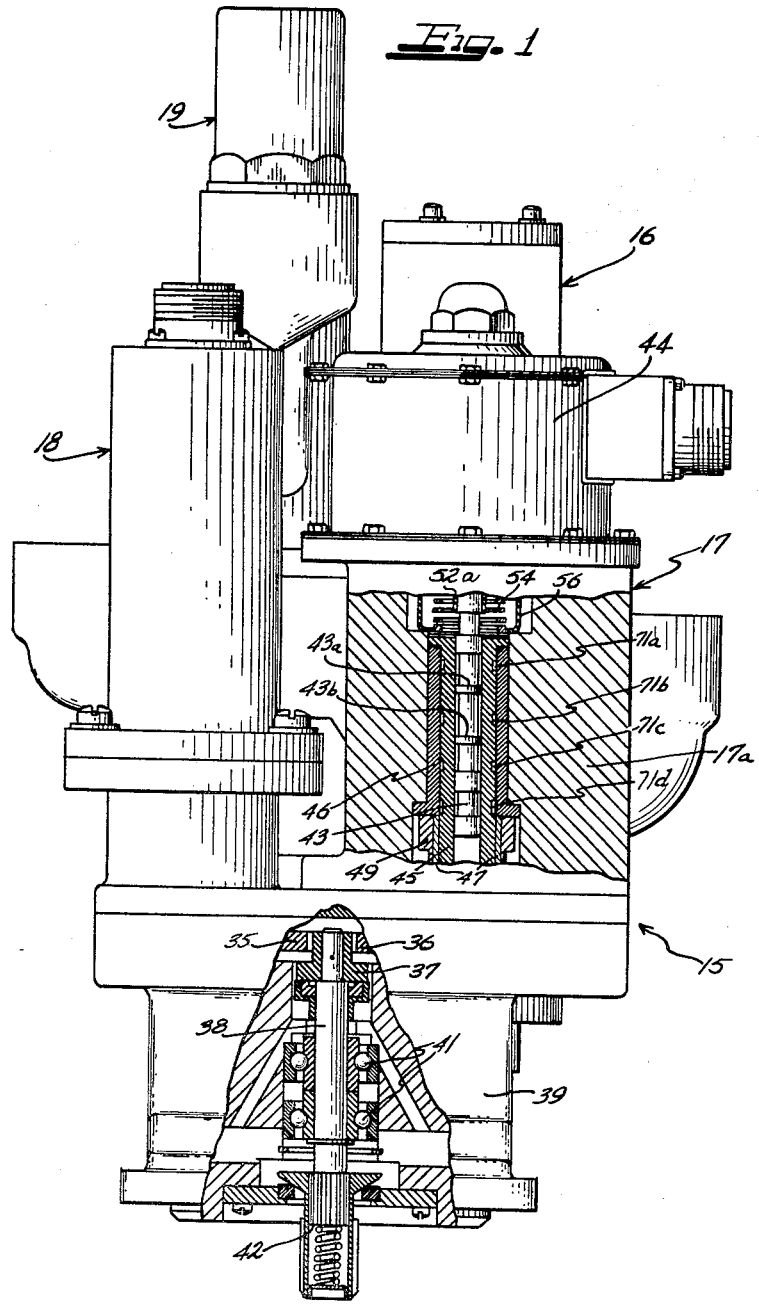
Figure 1 is an elevational view of a fuel control unit with parts broken away and parts in section illustrating details of construction of the engine drive connection of the unit as well as of the pilot valve.

It will be understood that the present invention finds a particularly useful application when employed in a fluid flow control system for a turbo-jet engine similar to that disclosed in my copending application, Serial No. 89,884, filed April 27, 1949. For complete details as to the structural provisions of such a system, reference may be had to the acknowledged application. By way of orientation, however, the operation of a control system may be briefly explained as follows.

The basic principle of a control system incorporating a fuel control device according to this invention is that it is, in general, a non-scheduling governor. By way of definitive explanation, it may be noted that with a full scheduling governor, engine speed is determined by a finite number of variables to produce a desired speed value. A non-scheduling governor, as herein disclosed, exploits the concept of "derivative anticipation," which means that future values of speed and temperature are electronically determined by the preceding rate of change of such functions. It is isochronous during steady state running, and isothermal during accelerations. The electronic control is based on the use of a direct current signal voltage proportional to engine speed and a direct current signal voltage proportional to tail-pipe temperature. The signals are amplified, various derivatives, integrals, and related functions as required for stabilization and control are taken, and the resulting signal is sent to a proportional solenoid of a pilot valve in control of the fuel flow through a hydraulic servo-operated throttle valve.

If, under normal steady running operations, a change in engine speed occurs, an increment in the governor generator signal voltage will be produced. The generator voltage is fed into a speed-determining circuit where the increment causes an unbalance in a speed circuit bridge. The bridge unbalance is then fed into an electronic selector which decides whether a speed control or temperature control circuit will be used. For small speed changes, the speed selector places the speed circuit in control. The signal is then amplified by the D.C. voltage amplifier and, together with various derivatives and integrals required for stability, is fed into the proportional solenoid of the pilot valve. The proportional solenoid constitutes a solenoid type motor capable of delivering a linear motion proportional to its input voltage and as applied to the present invention effects a deflection of the pilot valve piston through a distance proportional to the signal voltage and permits a high pressure to act selectively upon the top or the bottom of the throttle valve metering piston whereby an engine speed correction will be produced. When the engine speed returns to normal, the speed bridge is balanced, the solenoid current has decreased to zero, the solenoid has returned to neutral, and the throttle valve piston will remain in a fixed position.

Should a speed change result in a tail-pipe temperature above that allowable for acceleration, the temperature bridge of the governor will become unbalanced in the direction which places the temperature circuit in control. The current flowing to the electronic selector will be amplified by the D.C. voltage amplifier, and by the same sequence as described above with respect to operation during a normal steady running, the fuel flow to the engine will be controlled so as to maintain the indicated tail-pipe temperature in the engine.

Referring now to the drawings, the details of the structural improvements characterizing the present invention may be described. Referring particularly to Figures 1, 2, 3, and 4, a fuel control device is indicated generally by the reference numeral 15 and includes in integral assembly therewith a throttle valve 16, a pilot valve 17, a speed-sensing device 18 and a relief valve 19.

The inter-relationship of the various valve components of the fuel control device 15 is perhaps best exemplified in the schematic diagram shown in Figure 5. Fuel may be supplied by a booster pump (not shown) to a fuel line in communication with a positive displacement main fuel pump 21.

In general, the relief valve 19 accepts only that portion of the main fuel pump 21 output which is not required by the engine and returns it to the pump inlet. In accomplishing this end, the relief valve 19 must maintain a fixed, constant pressure drop across the throttle valve 16 so that the throttle valve 16 may effectively control the flow of fuel to the engine.

The discharge pressure of the fuel leaving the main fuel pump 21 and indicated for the sake of convenience as $P_d$ enters the relief valve 19 and acts on the bottom of a main metering piston 22. A second fuel pressure measured on the downstream side of the throttle valve 16 and indicated for the sake of convenience as $P_v$ is communicated to the relief valve 19 by a reference pressure line 23. The fuel passing through the reference pressure line 23 enters a recess 24 in the relief valve 19 through a restriction 25 and is permitted to act on the top of the main metering piston 22 along with a relief valve main spring 26.

Since the difference between the discharge pressure $P_d$ and the pressure $P_v$ is dependent upon the spring load of the main spring 26 and is independent of the absolute value of the discharge pressure $P_d$ the relief valve 19 controls the pressure drop across the governor throttle valve 16.

It will be understood that the aforedescribed condition refers to a normal operational status wherein a shut-off cock 27 provided on the downstream side of the throttle valve 16 is open and no flow will occur through the restriction 25. In such a condition, the fluid pressure acting on the top of the main metering piston 22 and indicated generally by the reference character $P_t$ will be substantially equal to the pressure $P_v$. It may be noted that there will only be a very small pressure drop across the shut-off cock 27 and other miscellaneous hydraulic equipment which may be located between the governor throttle valve 16 and the downstream side of the shut-off cock 27.

If the pressure on the downstream side of the shut-off cock 27 indicated as $P_c$ were used as a reference pressure, the pressure drop across the governor throttle valve 16 would not be constant, but would be dependent on the pressure drop through the line and the shut-off cock 27.

For normal running operations, the reference pressure line indicated by the reference numeral 28 would not be required; however, when it is desired to shut the engine down, the shut-off cock 27 will be closed and the pressure $P_v$ will become equal to the discharge pressure $P_d$ and thus the main metering piston 22 of the relief valve 19 would close except for the following sequence of events; the pressure $P_c$ would become very low in value, for example, approximately equal to atmospheric pressure and the fuel pressure at the top of the main metering piston 22, $P_t$, which would have been equal to the pressure $P_v$, would act to push a pressure selecting piston 29 in relief valve 19 open, thereby allowing flow through the restriction 25. The piston 29 is arranged in series with the restriction 25 and is exposed to the pressure $P_t$. Such a flow through the restriction 25 would cause a pressure drop across the restriction, thereby making the pressure $P_t$ less than the pressure $P_v$ which is equal to the discharge pressure $P_d$. When such a sequence of events occurs, the main metering piston 22 opens and relieves the output of the main fuel pump 21 to the pump inlet again via the relief valve outlet 19a and the return line 31 leading from the relief valve 19 to the inlet of the main fuel pump 21.

It should be noted that when the shut-off cock 27 is open, the pressure $P_c$ is not greatly different than the pressure $P_v$, and thus a spring 32 located above the pressure selecting piston 29 will ordinarily be strong enough to keep the pressure selecting piston 29 closed. However, when the shut-off cock 27 is closed, the pressure $P_c$ becomes low and thus the pressure $P_v$ will be greatly different from the pressure $P_c$, so that the pressure selecting piston 29 will be permitted to open.

The relief valve 19 is also provided with a pressure topping piston 33 which operates in much the same manner as the pressure selecting piston 29. The function of the pressure topping piston 33 is to limit the quantitative value to which the pressure $P_v$ may rise. If the pressure $P_v$ exceeds a predetermined quantitative value determined by a spring 34, the pressure topping piston 33 will open, thereby allowing flow through the restriction 25 and causing a pressure drop across the restriction 25, thus, the pressure $P_t$ will again be less than the pressure $P_v$ and the pressure $P_v$ will approach the value of the discharge pressure $P_d$. In practice, the pressure topping piston 33, being arranged in series with the restriction 25, serves to limit the attainable value of the pressure $P_t$ which, in turn, limits the value of the discharge pressure $P_d$.

The fuel control unit 15 may be provided with a driven connection to the jet engine accessory drive through a driving mechanism most clearly shown on Figure 1. As therein shown, suitable spur gears 35 and 36 are provided for the speed sensing unit 18 and the pilot valve 17, respectively, which are arranged to mesh in driven relationship with a pinion gear 37 pinned to a reduced diameter end portion of a shaft 38. The shaft 38 is suitably journaled within a base housing 39 by means of a conventional bearing structure 41. An end-sealed spline connection is provided for the shaft 38 as shown at 42.

Figure 4:
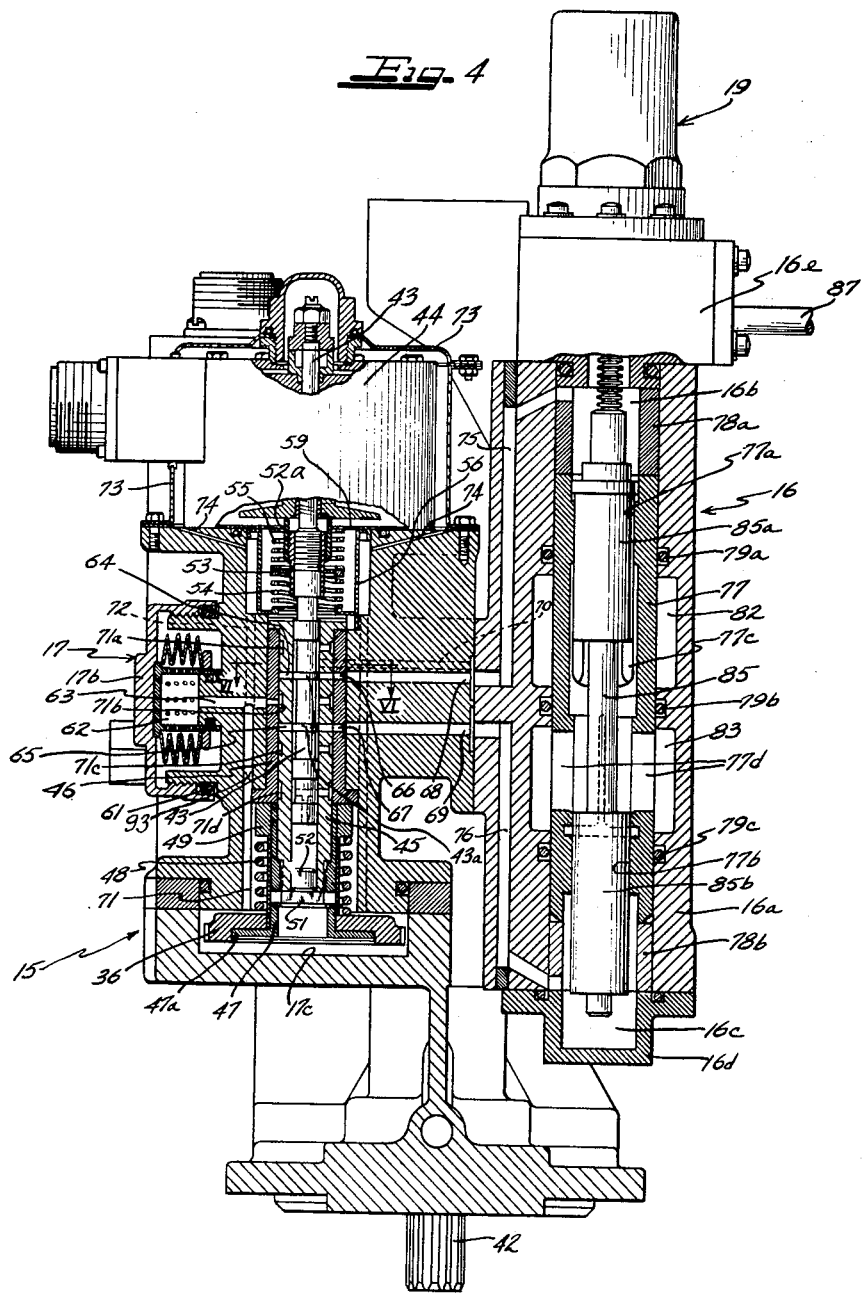
Figure 4 is a cross-sectional view with parts in elevation and with parts broken away illustrating additional details of construction of the pilot valve and the throttle valve.

Referring particularly to Figures 1 and 4, the pilot valve 17 of the present invention is shown as including a piston 43 having a plurality of spaced metering lands along its length which is generally vertically disposed so as to be cooperatively associated with an actuating mechanism such as a proportional solenoid indicated generally by the reference numeral 44.

The piston 43 is reciprocable within a rotatable sleeve 45 which is of generally cylindrical configuration and is suitably ported to establish a cooperative metering relationship with the metering lands provided on the piston 43. An additional bearing sleeve 46 of larger diameter than the rotatable sleeve 45 is carried by a pilot valve casing 17a and journals the rotatable sleeve 45 therein.

The rotatable sleeve 45 is driven through a clutch assembly including a generally cylindrical clutch element 47 having a radially extending flange portion 47a at one end thereof. The clutch element 47 is provided with a partially threaded center bore and may be firmly assembled in threaded relationship with a reduced diameter portion of the rotatable sleeve 45. The tube-like end portion of the clutch element 47 surrounds a portion of the rotatable sleeve 45 and lies in proximate abutting relationship to a radially flanged shoulder formed on the bearing sleeve 46.

A coiled clutch spring 48 is provided to surround the lower portion of the rotatable sleeve 45 and resiliently bias the gear 36 into driving relationship with the clutch face presented thereto by the radial flange portion 47a of the clutch element 47. A generally cylindrical spring retainer 49 having an enlarged collar portion on one end thereof abutting the bearing sleeve 46 effectively positions the spring 48 in biasing position relative to the gear 36 and the clutch element 47.

Slotted apertures may be provided in an intermediate portion of the clutch element 47 and the lowermost reduced diameter end portion of the rotatable sleeve 45 may be provided with slots so that a locking key 51 may be assembled in cooperative relationship with the sleeve 45 and the clutch element 47 to more securely link the two for co-rotation one with the other. A sleeve-type plug 52 may also be provided and may be inserted within the bore defined by the rotatable sleeve 45 adjacent the end thereof so as to seal the end of rotating sleeve 45 and thus cause the pressure reference at the bottom of piston 43 to be obtained from passage 71d.

The pilot valve piston 43 is initially loaded by a spring mechanism which comprises a specific feature of this invention. As may be seen on Figures 1, 4 and 11, an adjusting sleeve 52a having an internally threaded bore assembly on an intermediately threaded portion of the pilot valve piston 43 carries in integral assembly therewith a spring dividing washer 53. A pair of springs including a right hand spring 54 and a left hand spring 55 are placed in axial alignment on opposite sides of the spring dividing washer 53 in surrounding relationship to the pilot valve piston 43 and within the confines of a spring retainer 56 adapted to be supported within a hollow spring compartment defined by an upper portion of the pilot valve casing 17a.

Referring particularly to Figure 11, it will be noted that the reversely turned springs 54 and 55 are provided with suitable holding washers indicated at 57 and 58 respectively. The spring holding washers 57 and 58 are provided with diametrically opposed lugs 57a and 58a which are adapted to lockingly seat within appropriate radially spaced slots formed in the spring retainer 56, a cover element 59 (Fig. 4) and the spring dividing washer 53. It will be noted that by virtue of the provision of the slotted spring dividing washer 53 between the spring holding washers 57 and 58, the ends of the springs 54 and 55 are effectively tied together, thereby preventing repositioning of the springs. This feature, of course, tends to reduce the possibilities of resultant repositioning of the pilot valve due to repositioning of the springs.

It will also be apparent that the location of the novel spring attachment as above described places the springs below the proportional solenoid 44 in such a manner as to substantially decrease the distance between the effective point of attachment of the springs to the pilot valve piston 43 and the metering lands on the pilot valve piston 43. This feature is particularly significant in that it contributes to the reduction of the detrimental effects which are likely to follow as a result of differential expansion and contraction between components of the pilot valve assembly.

The use of reversely turned loading springs also prevents axial movement of the pilot valve piston 43 in case of twisting thereof because of a binding action with the rotatable sleeve 45.

The present invention further contemplates the provision of a filter in the inlet leading to the pilot valve 17. Referring particularly to Figure 4, it will be noted that a substantially circular flanged boss may be provided on one side of the pilot valve 17 which is externally threaded to receive in firm assembly therewith a cap 17b. The cap 17b is appropriately recessed near its end portion to seat an O ring 61 adjacent the end thereof whereby a sealed inlet chamber may be provided inside of the cap 17b and flange structure associate therewith.

A conventional filter structure may be firmly positioned against the pilot valve body by the cap 17b, such filter being identified generally by the reference numeral 62. The filter 62 is adapted to screen the flow of fluid passing from the inlet chamber in the cap 17b and passing into an inlet passageway 63 which extends radially inward towards the center of the pilot valve 17.

It will be noted that the rotatable sleeve 45 is provided with a series of axially spaced annular grooves on the peripheral surface thereof. It is also provided with diametral apertures identified by the reference numerals 64 and 65, respectively, which are arranged to lie in planar registry with suitable apertures 66 and 67 formed in the bearing sleeve 46. The apertures 66 and 67 in the bearing sleeve 46 are, in turn, arranged to lie in registry with suitable outlet passageways 68 and 69 extending radially outward through the body 17a of the pilot valve 17 toward the throttle valve 16.

Additional annular grooves on the rotatable sleeve 45 are identified by the reference numerals 71a, 71b, 71c and 71d. It will be noted that each of the grooves 71a, b, c and d are provided with suitable passageways whereby communication may be established between the grooves and the center bore extending through the rotatable sleeve 45.

The spaced metering lands provided on the pilot valve piston 43 are so located as to lie in proximate relationship to the various annular grooves formed on the rotatable sleeve 45. It will be noted, however, that two of the metering lands, shown in this particular embodiment as being of relatively narrow width and identified by the reference characters 43a and 43b, are arranged in such a manner as to effect a fluid flow controlling relationship with the apertures 64 and 65 and hence the apertures 66 and 67 leading to the outlet passageways 68 and 69.

It will be apparent, therefore, that when translating movement of the armature within the proportional solenoid 44 produces a plunger-like reciprocation of the pilot valve piston 43 against the bias of the springs 54 and 55 in response to a resultant signal transmitted to the proportional solenoid 44 by the electronic control device associated with the fuel flow control unit 15, the fluid entering the inlet chamber within the cap 17b will pass through the filter 62 and into the inlet passageway 63 after which it will be effectively metered and selectively introduced into either of the outlet passageways 68 and 69 depending on the respective relative vertical positioning of the pilot valve piston 43 within the rotatable sleeve 45.

The fluid passing through the pilot valve 17 and operating as a servo fluid therein may conveniently comprise the fuel, the flow of which is being controlled by the unit 15. The inlet of the pilot valve 17 may be connected to the discharge side of the main fuel pump 21 so as to be subjected to a high pressure $P_d$.

Another of the features of the present invention lies in the provision of a pilot valve structure wherein all working parts may be surrounded by the fuel constituting the servo fluid in order that the components thereof may be kept at the same temperature. By so regulating the temperatures of the pilot valve components, repositioning of the pilot valve is substantially precluded because differential expansion or contraction of the pilot valve components is eliminated.

In order to accomplish this objective, the body 17a of the pilot valve 17 is provided with a vertical passageway 71 which connects the inlet passageway 63 with a gear and clutch chamber 17c defined by the lower portion of the body 17a. As is clearly shown in Figures 4 and 6, the body 17a is provided with a plurality of vertical passageways 72 which connect the gear and clutch chamber 17c with the hollow space surrounding the springs 54 and 55 in the upper portion of the body 17a. A casing 73 surrounds the proportioning solenoid 44 and the interior thereof is placed in communication with the hollow space surrounding the springs 54 and 55 by means of angularly inclined fluid passageways 74 which pass through the body 17a of the pilot valve 17. Thus it will be apparent that a portion of the fluid entering the inlet passageway 63 will pass downwardly through the passageway 71 into the chamber 17c and thence upwardly through the passageways 72 so as to completely surround the spring mechanism. The fluid will also enter the passageways 74 and pass into the casing structure 73 surrounding the proportional solenoid 44. The fluid may be vented to the outlet side of the relief valve 19 through a passage 70 formed in the body 17a. Restriction 93 is placed in passage 71 to limit the amount of servo fluid that is circulated to control the temperature of the pilot valve.

The details of construction of the throttle valve 16 are best shown on Figures 3 and 4. It will be noted that the throttle valve 16 is provided with a body 16a suitably drilled to provide a pair of passageways 75 and 76 which communicate with the outlet passageways 68 and 69, respectively, leading from the pilot valve 17. Thus, servo fluid emanating from the outlet passageways 68 and 69 of the pilot valve 17 may be conducted to hollow chambers 16b and 16c which are formed on opposite ends of the throttle valve body 16a and enclosed by a bottom cap structure 16d and a potentiometer drive housing 16e which is assembled on the top portion of the body 16a. It will be noted that O-ring gaskets may be employed in connection with the cap 16d and the housing 16e so as to cooperate with the body 16a of the throttle valve 16 and seal the hollow chambers 16b and 16c.

The throttle valve 16 is adapted to meter the flow of fluid emanating from the main fuel pump 21 (Figure 5) to the burning nozzles of the jet engine (not shown) with which the fuel control unit 15 is associated. To accomplish that end, the throttle valve 16 is provided with a throttle sleeve 77 which is loosely fitted within a centrally disposed bore defined by the body 16a and which is axially positioned therein by end caps 78a and 78b. The throttle sleeve 77 is fluid sealed at three places within the body 16a by means of O-rings 79a, 79b and 79c which may be cooperatively seated in appropriate circular grooves cut in the body 16a of the throttle valve 16 to surround the throttle sleeve 77 at three predetermined axial locations.

It may be noted that the sleeve arrangement eliminates the differential expansion and contraction of the throttle sleeve and the throttle piston elements associated therewith, which action frequently occurs in the fuel flow control units heretofore provided which usually employed a throttle sleeve pressed directly into the throttle valve body.

Correlating the schematic diagram shown in Figure 5 with the throttle valve structure shown in Figure 3, the throttle valve 16 is provided with an inlet 81 which is adapted to be connected by suitable means to a conduit leading from the main fuel pump 21. The inlet 81 terminates in an inlet chamber 82 which is generally annular and which surrounds the throttle sleeve 77. It will be understood that the inlet chamber 82 may be conveniently defined by the body 16a of the throttle valve 16 as a recess in the bore walls thereof.

An outlet chamber 83, also annular in configuration and preferably defined by the body 16a so as to surround the throttle sleeve 77 in axially spaced relationship to the inlet chamber 82 communicates with an outlet 84, which is also suitably adapted for effecting conduit connections therewith.

Referring particularly to Figures 3, 4, 9 and 10, the present invention specifically contemplates the provision of a throttle sleeve 77 having a fixed upper leakage land 77a and a fixed lower leakage land 77b spaced therefrom. Intermediate the spaced leakage lands 77a and 77b are provided a plurality of radially spaced inlet apertures 77c which are adapted to place the inlet chamber 82 in communication with the internal bore defined by the throttle sleeve 77. The throttle sleeve 77 further defines a pair of complexly shaped diametrically opposed outlet apertures 77d which are adapted to place the bore within the throttle sleeve 77 in communication with the outlet chamber 83.

A long piston 85 reciprocable within the throttle sleeve 77 and provided with spaced skirt portions 85a and 85b cooperable with the leakage lands 77a and 77b respectively operates to control the flow of fluid from the inlet chamber 82 through the inlet apertures 77c and out through the outlet apertures 77d into the outlet 84.

It should be apparent from the foregoing description that the throttle valve piston 85 may be hydraulically balanced by the fluid acting on the ends of the piston 85 which are exposed to the pressures developed within the chambers 16b and 16c. It may be noted that for consistent action of the pilot valve 17, the leakage between the zones defined by the chambers 16b and 16c and the center zone lying between the spaced leakage lands 77a and 77b must be kept the same and equal at all positions of the throttle valve piston 85, by providing fixed leakage lands in the throttle sleeve 77 and employing a long piston 85, it is not necessary that the throttle sleeve be absolutely perfect and indeflectable since extremely favorable operating conditions may be produced merely by employing a piston which is non-deforming and which is constant in diameter, characteristics which may be satisfactorily approached by mass production methods.

Reference to our acknowledged copending application, U.S. Serial No. 89,884, filed April 27, 1949, will indicate that a complete electronic control of which the fuel control unit 15 is an essential component, actually operates as a servo mechanism when considered in connection with a simple turbo jet engine which must be regulated by controlling the amount of fuel flowing into the burners of the engine. As shown on Figure 8, certain signals are introduced into a lead controller and after appropriate amplification are employed to operate the valve elements of the fuel control unit 15 which is actually in physical control of the fuel flowing into the burners of the jet engine.

The electronic control herein referred to has been characterized as isochronous under steady state running conditions and experience upon test stands has shown that for critically damped speed governing at all engine speeds, or for like stability at all engine speeds, the time constant of the lead controller must be made a function of engine speed. Flight tests have also shown that this time constant must be made a function of altitude. It has been determined, however, that the damping or time constant of the control may be made a function of fuel flow rather than a function of both speed and altitude.

Briefly, one form of the lead controller component of the electronic apparatus described in our acknowledged copending application may incorporate so-called altitude resistors which may be switched in and out of an electric circuit in response to variations in altitude and a plurality of condensers which may be switched in and out of the electric circuit in response to variations in speed. In other words, either the condensers or the resistors could be changed to vary the time constant of the electric circuit.

According to the present invention, a mechanical mechanism is provided whereby the resistances corresponding to the altitude resistors may be made to vary in response to variations in fuel flow and the condensers may be maintained in a predetermined setting. Thus, a variable resistor or a potentiometer 86 (Fig. 8) may be positioned in response to throttle valve position in order that the time constant of the control may be matched to the turbo jet engine. Fig. 8 shows diagrammatically how the various essential elements of the electronic fuel control are interrelated when damping is made a function of fuel flow.

Referring particularly to Figs. 3 and 7, the throttle valve 16 is shown with the potentiometer drive housing 16e sealingly affixed on the top of the body 16a immediately superjacent the hollow chamber 16b.

The present invention contemplates the provision of a conventional potentiometer 86 which may be positioned by the rotative action of a shaft 87. Such a shaft 87 is shown entering the potentiometer housing 16e on Fig. 7. In order to avoid leakage of the servo fluid from the chamber 16b outwardly through the potentiometer housing 16e, the shaft 87 is surrounded by a seal mechanism indicated generally by the reference numeral 88 and is journalled for low friction rotation in a conventional bearing structure indicated generally by the reference numeral 89. A pinion gear 91 is firmly geared to a reduced diameter of the shaft 87 and is arranged in cooperative relationship to a rack 92 which may conveniently form one end of the throttle valve piston 85.

It will be evident that as the throttle valve piston 85 moves reciprocatingly upwards and downwards in the throttle valve sleeve 77, the rack and pinion, 92 and 91, respectively, will cooperate to selectively rotate the shaft 87 for adjustment of the potentiometer 86. In this manner, the time constant of the fuel control system may be matched to the engine in response to variations in fuel flow as manifested by throttle valve position.

It will be understood, of course, that fuel flow may be manifested in various ways, for example, as a function of fuel pressure. Thus, it is conceivable that a pressure actuated switch could also be employed as the mechanical link indicated generally by the reference character L between the fuel control unit 15 and the potentiometer 86 (Fig. 8).

In operation, the speed sensing device indicated generally by the reference numeral 18 is employed to produce a speed term which may be introduced into the electronic control associated with the fuel flow control unit 15. The speed term may be combined with the speed term of the electronic control. Similarly, a temperature signal may be introduced to the electronic control. The speed and temperature signals are sent to the electronic selector, which chooses the signal required during the operation cycle, and a resulting signal is amplified and applied to the proportional solenoid 44. The rotation of the sleeve 45 in the pilot valve and the reciprocation of the pilot valve piston 43 in response to a translation produced by the proportional solenoid 44 permits a closely controlled metering action to occur between the relatively rotating slots or apertures 64 and 65 in the sleeve 45 and the metering lands 43a and 43b on the piston 43. The metered fluid will thus be selectively introduced into one or the other of the outlet passageways 68 or 69 and will thereby serve to control the position of hydraulically balanced piston 85 in the throttle valve 16.

The relief valve 19 will accept that portion of the fuel which is not required by the engine and return it to the main fuel pump in the inlet. At the same time, the relief valve 19 will maintain a fixed constant pressure drop across the throttle 17. Fluid emanating from the throttle valve may be subjected to further safety regulation by passing the fuel through appropriate overspeed devices and manually operated shut off stops as will be readily understood by those versed in the art. In any event, the fuel supply, as controlled by the throttle valve, is introduced into a flow divider after which the fuel is distributed to appropriate burners in the jet engine with which the fuel control unit 15 is associated.

It will be apparent from the aforegoing description that we have provided an improved fuel flow control unit for an electronically actuated fuel system of a turbojet engine which is characterized by the provision of novel components which are easier to produce and cheaper to manufacture but which operate with improved efficiency.

It will be further apparent that we have described a fuel flow control unit having a novel arrangement of components whereby the detrimental effects due to differential expansion and contraction of control unit elements as well as repositioning of valve components is substantially precluded.

It will be understood, of course, that a person skilled in the art might suggest various minor modifications to the structure herein described by way of preferred embodiment and illustrative example only, however, we do not intend to be limited to the precise details set out for the sake of clarity but wish to embrace within the scope of our invention all such modifications as reasonably and properly come within the purview of our contribution to the art.

We claim as our invention:

1. A throttle valve for a fluid fuel control unit, comprising, in combination, a body defining a bore with spaced inlet and outlet chambers recessed in the walls of the bore, a throttle sleeve loosely fitted in said bore, end caps in said body positioning said throttle sleeve, said sleeve defining inlet and outlet apertures registering with said inlet and outlet chambers, respectively, said sleeve further defining fixed spaced leakage lands of equal length disposed axially outward of said inlet and outlet apertures, a piston having peripheral wall portions slidably reciprocable in said sleeve, and pressure responsive means on opposite ends of said piston, whereby said piston may effectively meter the flow of fluid from said inlet chamber through said sleeve to said outlet chamber, said peripheral wall portion having an axial length such as to maintain full engagement of said leakage lands throughout the range of said piston.

2. A throttle valve for a fluid fuel control unit comprising, in combination, a body defining a bore with spaced inlet and outlet chambers recessed in the walls of said bore, a throttle sleeve loosely fitted in said bore, end caps in said body positioning said throttle sleeve in said body, said sleeve defining inlet and outlet apertures registering with said inlet and outlet chambers respectively, said sleeve further defining fixed spaced leakage lands of equal length disposed axially outward of said inlet and outlet apertures, a piston reciprocable in said sleeve and having peripheral wall portions slidably engaging said leakage lands of said sleeve, said peripheral wall portions having an axial length such as to maintain full engagement of said leakage lands throughout the range of said piston, a plurality of O ring gaskets arranged in axially spaced relation between said throttle sleeve and said body, whereby together with the piston in said sleeve the center zone generally intermediate the fixed spaced leakage lands of said sleeve may be effectively sealed from the end portions of the valve and pressure responsive means on opposite ends of the piston, whereby the flow of fluid from said inlet chamber will be metered through said sleeve to said outlet chamber.

3. In a throttle valve for a fluid fuel control unit, the improvement of a ported valve body, a loosely fitting apertured sleeve therein, said sleeve defining axially spaced leakage lands of equal length in the bore thereof, and a metering piston reciprocably slidable in said sleeve to meter fluid flow through said sleeve, said piston having a peripheral surface engaging with said lands, said surface including wall portions each having an axial length such as to maintain full engagement of said leakage lands throughout the range of movement of said piston.

4. In a throttle valve for a fluid fuel control unit, the improvement of a ported valve body, a loosely fitting apertured sleeve therein, said sleeve defining axially spaced leakage lands of equal length in the bore thereof, a metering piston having peripheral wall portions slidably reciprocable in said sleeve to meter fluid flow through said sleeve, said wall portions having an axial length such as to maintain full engagement of said leakage lands throughout the range of said piston, a rack carried by said piston and a pinion journaled in said body for translating reciprocable movements of said metering piston into predetermined angular displacements of said pinion.

5. In a fluid fuel control unit, a throttle valve comprising a body having a bore formed therein with spaced inlet and outlet chambers recessed in the walls of the bore, a throttle sleeve loosely fitted in said bore, end caps in said body positioning said throttle sleeve, said sleeve having inlet and outlet apertures formed therein to register with said inlet and outlet chambers, respectively, said sleeve further having fixed spaced leakage lands formed therein disposed axially outward of said inlet and outlet apertures, a piston reciprocable in said sleeve whereby said piston may effectively meter the flow of fluid from said inlet chamber through said sleeve to said oulet chamber, a relief valve comprising a body having an inlet and an outlet, said inlet communicating with the inlet chamber of said throttle valve, a main metering piston reciprocable in said body of said relief valve and in control of the flow of fluid therethrough, means for loading opposite ends of said main metering piston of said relief valve with fluid fuel at pressures corresponding to the pressures in said inlet and outlet chambers of said throttle valve, respectively, additional means loading one end of said main metering piston, a pressure selecting piston, a by-pass defined by said body controlled by said pressure selecting piston, means normally biasing said pressure selecting piston to a closed position, said pressure selecting piston being in pressure communication with said one end of said metering piston, said metering piston being further provided with means communicating said one end of said metering piston with the relief valve outlet, and a pressure topping piston in control thereof, biasing means biasing said pressure topping piston to a closed position and operative to limit the attainable quantitative value of the pressure at said one end of the metering piston, said relief valve being operable to control the pressure drop across the throttle valve.

6. In a fuel control unit, a throttle valve having a body formed with a bore with spaced inlet and outlet chambers recessed in the walls of said bore, a throttle sleeve loosely fitted in said bore, end caps in said body positioning said throttle sleeve in said body, said sleeve having inlet and outlet apertures formed therein in register with said inlet and outlet chambers, respectively, said sleeve further including fixed spaced leakage lands disposed axially outward of said inlet and outlet apertures, a piston reciprocable in said sleeve, a plurality of O ring gaskets arranged in axially spaced relation between said throttle sleeve and said body cooperating with the piston in said sleeve to seal the center zone generally intermediate the fixed spaced leakage lands of said sleeve from the end portions of the valve, whereby the piston may effectively operate to meter the flow of fluid from said inlet chamber through said sleeve to said outlet chamber, a relief valve comprising a body having an inlet and an outlet, said inlet communicating with the inlet chamber of said throttle valve, a main metering piston reciprocable therein in control of the flow of fluid therethrough, means for loading opposite ends of said main metering piston with fluid fuel at pressures corresponding to the pressures in said inlet and outlet chambers of said throttle valve respectively, additional means loading one end of said main metering piston, a by-pass defined by said body and a pressure selecting piston in control thereof, means normally biasing said pressure selecting piston to a closed position, said pressure selecting piston being in pressure communication with said one end of said metering piston, said metering piston being further provided with means communicating said one end of said metering piston with the relief valve outlet, whereby pressure in the local of said one end of said metering piston will effect actuation of said pressure selecting piston for by-passing of the fluid, said relief valve being operable to control the pressure drop across said throttle valve.

7. In a fluid fuel control unit, a throttle valve comprising a body having a bore formed therein with spaced inlet and outlet chambers recessed in the walls of the bore, a throttle sleeve loosely fitted in said bore, end caps in said body positioning said throttle sleeve, said sleeve having inlet and outlet apertures formed therein in register with said inlet and outlet chambers, respectively, said sleeve further including fixed spaced leakage lands disposed axially outward of said inlet and outlet apertures, a piston reciprocable in said sleeve, whereby said piston may effectively meter the flow of fluid from said inlet chamber through said sleeve to said outlet chamber, a relief valve having an inlet and an outlet and having a main metering piston reciprocable therein in control of the flow of fluid therethrough, said inlet communicating with the inlet chamber of said throttle valve, means for loading opposite ends of said piston with fluid fuel at pressures corresponding to the pressures in said inlet and outlet chambers of said throttle valve, additional means loading one end of said piston, a pressure selecting piston, a by-pass defined by said body controlled by said pressure selecting piston, means normally biasing said pressure selecting piston to a closed position, said pressure selecting piston being in pressure communication with said one end of said metering piston, said metering piston being further provided with means for communicating said one end of said metering piston with the relief valve outlet, and a pressure topping piston in control thereof, means normally biasing said pressure topping piston to a closed position and operative to limit the attainable quantitative value of the pressure at said one end of said metering piston, said relief valve being operable to control the pressure drop across said throttle valve, variable resistor means having a movable control member electrically connected with an electronic control for modification of an electronic signal furnished thereto, and a driving means mechanically interconnecting the piston of said throttle valve and said movable control member for selectively adjusting said variable resistor means in response to the fuel flow through said throttle valve as manifested by the position of said piston.

8. In a relief valve for a fuel control system, a body having a inlet passage, a control passage and an outlet passage respectively adapted to communicate with portions of a fuel system normally having progressively lower pressures, a main piston having a forward end in communication with said inlet passage and a rearward end in communication with said control passage, biasing means urging said main piston forwardly, means defining a first fluid flow path connecting said inlet and outlet passages, valve means in said first fluid flow path connected to said main piston to control flow between said inlet and outlet passages, said main piston being movable rearwardly to increase flow between said inlet and outlet passages when the force exerted by pressure on said forward end exceeds the total force exerted by said biasing means and by pressure on said rearward end, a first auxiliary piston having one end facing in one direction and in communication with said control passage, and second biasing means urging said auxiliary piston in said one direction, means defining a second fluid flow path connecting said control and outlet passages, valve means in said second fluid flow path connected to said first auxiliary piston to control flow between said control and outlet passages, said first auxiliary piston being movable in a direction opposite said one direction to establish flow between said control and outlet passages when the force exerted by pressure on said one end thereof exceeds the total force exerted by pressure on the other end thereof and by said second biasing means, a second auxiliary piston in said main piston having a rearward end in communication with said control passage and third biasing means urging said auxiliary piston rearwardly, means defining a third fluid flow path between said control and outlet passages, and valve means in said third fluid flow path connected to said second auxiliary piston to control flow between said control and outlet passages, said second auxiliary piston being movable forwardly to establish flow between said control and outlet passages when the force exerted by pressure on said rearward end thereof exceeds the total force exerted by pressure on the forward end thereof and by said third biasing means.

9. In a fuel control system including a fuel pump having an inlet and an outlet, a throttle valve having an inlet and an outlet, and a conduit connecting said fuel pump outlet to said throttle valve inlet, a relief valve comprising a body having an inlet passage communicating with said conduit, a control passage communicating with said throttle valve outlet and an outlet passage communicating with said fuel pump inlet, a main piston having a forward end in communication with said inlet passage and a rearward end in communication with said control passage, biasing means urging said main piston forwardly, means defining a first fluid flow path connecting said inlet and outlet passages, valve means in said first fluid flow path connected to said main piston to control flow between said inlet and outlet passages, said main piston being movable rearwardly to increase flow between said inlet and outlet passages when the force exerted by pressure on said forward end exceeds the total force exerted by said biasing means and by pressure on said rearward end, an auxiliary piston having one end facing in one direction and in communication with said control passage, second biasing means urging said auxiliary piston in said one direction, means defining a second fluid flow path connecting said control and outlet passages and valve means in said second fluid flow path connected to said auxiliary piston to control flow between said control passage and said outlet passage, said auxiliary piston being movable in a direction opposite said one direction to establish flow between said control and outlet passages when the force exerted by pressure on said one end thereof exceeds the total force exerted by pressure on the other end thereof and by said second biasing means.

10. In a fuel control system including a fuel pump having an inlet and an outlet, a throttle valve having an inlet and an outlet, and a shut-off valve having an inlet and an outlet, a first conduit connecting said fuel pump outlet and said throttle valve inlet and a second conduit connecting said throttle valve outlet and said shut-off valve inlet, a relief valve comprising a body having an inlet passage communicating with said first conduit, a first control passage communicating with said second conduit, a second control passage communicating with said shut-off valve outlet, and an outlet passage communicating with said fuel pump inlet, a main piston having a forward end in communication with said inlet passage and a rearward end in communication with said first control passage, biasing means urging said main piston forwardly, means defining a first fluid flow path connecting said inlet and outlet passages, valve means in said first fluid flow path connected to said main piston to control flow between said inlet and outlet passages, said main piston being movable rearwardly to increase flow between said inlet and outlet passages when the force exerted by pressure on said forward end exceeds the total force exerted by said biasing means and by pressure on said rearward end, an auxiliary piston having one end facing in one direction and in communication with said first control passage and having its other end in communication with said second control passage, means defining a second fluid flow path connecting said first control passage and said outlet passage, and valve means in said second fluid flow path connected to said auxiliary piston to control flow between said first control passage and said outlet passage, said auxiliary piston being movable in a direction opposite said one direction to establish flow between said first control passage and said outlet passage when the force exerted by pressure on said one end thereof exceeds the total force exerted by pressure on the other end thereof and by said second biasing means.

References Cited in the file of this patent

UNITED STATES PATENTS

| | | |
|---|---|---|
| 285,163 | Ross | Sept. 18, 1883 |
| 312,484 | Luther | Feb. 17, 1885 |
| 534,951 | Cash | Feb. 26, 1895 |
| 1,014,168 | Nolan | Jan. 9, 1912 |
| 1,180,000 | Bloom | Apr. 18, 1916 |
| 1,492,856 | McCurdy | May 6, 1924 |
| 1,933,454 | Sidney | Oct. 31, 1933 |
| 1,964,616 | Willson | June 26, 1934 |
| 1,998,656 | Bryan | Apr. 23, 1935 |
| 2,020,773 | Ernst | Nov. 12, 1935 |
| 2,102,865 | Vickers | Dec. 21, 1937 |
| 2,318,449 | Beeh | May 4, 1943 |
| 2,320,763 | Trantman | June 1, 1943 |
| 2,422,808 | Stokes | June 24, 1947 |
| 2,436,147 | LeClair | Feb. 17, 1948 |
| 2,470,382 | Vanni | May 17, 1949 |
| 2,474,772 | Ashton | June 28, 1949 |
| 2,479,813 | Chamberlin | Aug. 23, 1949 |
| 2,482,254 | Fairchild | Sept. 20, 1949 |
| 2,488,221 | Moore | Nov. 15, 1949 |
| 2,508,260 | Holley | May 16, 1950 |
| 2,509,504 | Jensen | May 30, 1950 |
| 2,573,724 | Neal | Nov. 6, 1951 |
| 2,579,051 | Rose | Dec. 18, 1951 |
| 2,588,522 | Harris | Mar. 11, 1952 |
| 2,641,279 | Baldwin | June 9, 1953 |
| 2,644,427 | Sedgfield | July 7, 1953 |
| 2,658,523 | Johnson | Nov. 10, 1953 |
| 2,665,704 | Kanuch | Jan. 12, 1954 |

FOREIGN PATENTS

| | | |
|---|---|---|
| 82,841 | Sweden | Mar. 12, 1935 |